United States Patent
Röglinger

(10) Patent No.: US 11,303,475 B2
(45) Date of Patent: Apr. 12, 2022

(54) REMOTE ACCESS AND CONTROL SYSTEM AND CORRESPONDING METHOD

(71) Applicant: Rohde & Schwarz GmbH & Co. KG, Munich (DE)

(72) Inventor: Sebastian Röglinger, Pfaffenhofen (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 144 days.

(21) Appl. No.: 16/547,146

(22) Filed: Aug. 21, 2019

(65) Prior Publication Data

US 2020/0396102 A1  Dec. 17, 2020

(30) Foreign Application Priority Data

Jun. 13, 2019  (EP) .................................... 19179849

(51) Int. Cl.
| | |
|---|---|
| *H04L 12/46* | (2006.01) |
| *H04L 41/042* | (2022.01) |
| *H04L 29/06* | (2006.01) |
| *H04L 67/025* | (2022.01) |
| *G06F 21/62* | (2013.01) |
| *H04L 41/0813* | (2022.01) |
| *H04L 41/0893* | (2022.01) |
| *H04L 41/22* | (2022.01) |

(Continued)

(52) U.S. Cl.
CPC .......... *H04L 12/4675* (2013.01); *G06F 21/40* (2013.01); *G06F 21/629* (2013.01); *H04L 41/042* (2013.01); *H04L 41/0813* (2013.01); *H04L 41/0893* (2013.01); *H04L 41/22* (2013.01); *H04L 43/065* (2013.01); *H04L 63/0272* (2013.01); *H04L 63/0869* (2013.01); *H04L 67/025* (2013.01); *H04L 67/125* (2013.01); *H04W 12/06* (2013.01)

(58) Field of Classification Search
CPC ............ H04L 12/4675; H04L 12/4641; H04L 12/4658; H04L 12/4662; G06F 21/40; G06F 11/2294; G06F 11/00; H04B 7/18584
USPC ......................................................... 726/15
See application file for complete search history.

(56) References Cited

U.S. PATENT DOCUMENTS

| | | | | |
|---|---|---|---|---|
| 5,075,857 A | * | 12/1991 | Maresca | .................. G01V 1/16 702/15 |
| 5,530,373 A | * | 6/1996 | Gibson | ................ G01R 13/345 324/115 |

(Continued)

FOREIGN PATENT DOCUMENTS

| | | |
|---|---|---|
| DE | 10018651 A1 | 12/2001 |
| JP | 2002024670 A | 1/2002 |

OTHER PUBLICATIONS

Clement et al., "Adapting Test and Measurement Tools to CentralCasting IP Contribution", 2003 (Year: 2003).*

(Continued)

*Primary Examiner* — Ondrej C Vostal

(74) *Attorney, Agent, or Firm* — Ditthavong, Steiner & Mlotkowski

(57) ABSTRACT

A remote access and control system for test and measurement setups is provided. The remote access and control system comprises at least one virtual network, wherein the at least one virtual network is persistently defined as a set of test and measurement instruments and accompanying hardware.

20 Claims, 7 Drawing Sheets

```
┌─────────────────────────────────┐
│  Employ at least one virtual    │ ─── 100
│  network, wherein the at least  │
│  one virtual network is         │
│  persistently defined as a set  │
│  of test and measurement        │
│  instruments and accompanying   │
│  hardware                       │
└─────────────────────────────────┘
              │
              ▼
┌─────────────────────────────────┐
│  Grant an access level to at    │ ─── 101
│  least one remote system to the │
│  at least one virtual network,  │
│  wherein the at least one       │
│  remote system comprises at     │
│  least a part of the set of     │
│  test and measurement           │
│  instruments and accompanying   │
│  hardware                       │
└─────────────────────────────────┘
```

(51) Int. Cl.
*H04L 43/065* (2022.01)
*H04L 67/125* (2022.01)
*G06F 21/40* (2013.01)
*H04W 12/06* (2021.01)

(56) References Cited

U.S. PATENT DOCUMENTS

| | | | |
|---|---|---|---|
| 6,968,302 B1 | 11/2005 | Ahrens et al. | |
| 7,558,273 B1* | 7/2009 | Grosser, Jr | H04L 12/4645 370/389 |
| 8,305,903 B1* | 11/2012 | Louise | G06F 15/00 370/241 |
| 8,875,233 B2* | 10/2014 | Baykal | H04L 61/6022 726/2 |
| 8,918,631 B1* | 12/2014 | Kumar | H04L 61/6022 713/151 |
| 8,934,492 B1* | 1/2015 | King | H04L 12/4675 370/397 |
| 9,160,633 B1* | 10/2015 | Ruble | H04L 43/022 |
| 9,832,136 B1* | 11/2017 | Gibson | H04L 63/0218 |
| 10,230,709 B1* | 3/2019 | Kanakarajan | H04L 41/28 |
| 2002/0070966 A1 | 6/2002 | Austin | |
| 2002/0070968 A1 | 6/2002 | Austin et al. | |
| 2004/0034496 A1 | 2/2004 | Correll et al. | |
| 2004/0037230 A1 | 2/2004 | Kroboth et al. | |
| 2004/0039970 A1 | 2/2004 | Barnard et al. | |
| 2005/0022087 A1 | 1/2005 | Pramanick et al. | |
| 2005/0102580 A1* | 5/2005 | House | G06F 11/2294 714/38.14 |
| 2005/0138149 A1* | 6/2005 | Bhatia | H04L 12/28 709/220 |
| 2005/0163102 A1* | 7/2005 | Higashitaniguchi | H04L 12/4666 370/351 |
| 2007/0038741 A1 | 2/2007 | Gerholdt | |
| 2009/0279552 A1* | 11/2009 | Dong | H04L 12/4666 370/395.53 |
| 2010/0217882 A1* | 8/2010 | Yang | H04L 12/4633 709/229 |
| 2010/0281412 A1 | 11/2010 | Cataldo et al. | |
| 2011/0023125 A1* | 1/2011 | Kim | H04L 67/18 726/26 |
| 2012/0300784 A1* | 11/2012 | Jiang | H04L 45/00 370/395.53 |
| 2012/0303744 A1* | 11/2012 | Onoue | G06F 21/606 709/217 |
| 2014/0081919 A1* | 3/2014 | Matsumoto | G06F 11/1464 707/652 |
| 2014/0236527 A1 | 8/2014 | Chan et al. | |
| 2014/0310354 A1* | 10/2014 | Fountain | H04L 47/32 709/204 |
| 2014/0354727 A1* | 12/2014 | Sasayama | B41J 2/2132 347/15 |
| 2015/0146727 A1* | 5/2015 | Ye | H04L 45/745 370/392 |
| 2016/0092175 A1 | 3/2016 | Keene et al. | |
| 2016/0127958 A1* | 5/2016 | Viswanathan | H04W 48/16 370/331 |
| 2016/0134563 A1* | 5/2016 | Yu | H04L 12/4625 370/390 |
| 2016/0308981 A1* | 10/2016 | Cortes Gomez | H04L 67/16 |
| 2016/0359983 A1* | 12/2016 | Balogh | H04L 67/2804 |
| 2017/0067962 A1 | 3/2017 | Schreier et al. | |
| 2017/0126552 A1* | 5/2017 | Pfaff | H04L 45/38 |
| 2017/0155542 A1* | 6/2017 | Fang | H04L 41/0654 |
| 2018/0310331 A1* | 10/2018 | Ostberg | H04W 28/12 |
| 2019/0207674 A1* | 7/2019 | Roy | H04B 7/18584 |
| 2019/0342184 A1* | 11/2019 | May | G06N 5/04 |
| 2020/0053026 A1* | 2/2020 | Rangachari | H04L 45/44 |
| 2020/0081814 A1* | 3/2020 | Srinivasan | G06F 8/71 |
| 2020/0336401 A1* | 10/2020 | Cociglio | H04L 47/283 |
| 2020/0404076 A1* | 12/2020 | Mahadevan | H04L 41/0836 |

OTHER PUBLICATIONS

Merriam-Webster, "persistent", 2021 (Year: 2021).*
Merriam-Webster, "update", 2021 (Year: 2021).*
Ybarra, "Introduction to Wireless Control and Virtual Instrumentation using LabVIEW", 1998 (Year: 1998).*
IIEEE, "Frame Extensions for Virtual Bridged Local Network (VLAN) Tagging on 802.3 Networks", IEEE Std 802.3ac-1998, 1998 (Year: 1998).*
Kong, "microservices", 2021 (Year: 2021).*
Roglinger, "Remote Access and Control System and Corresponding Method", EP 3751532 A1, 2019 (Year: 2019).*
Zheng, "A Virtual Network Function Based Micro-Services Management Method And Network Management System", CN 107483222 A, 2016 (Year: 2016).*
Rohde & Schwarz, Secure Remote Service, Jan. 2017, PD 5214. 8819.32 V 01.00, 2 pages.

* cited by examiner

REMOTE ACCESS AND CONTROL SYSTEM AND CORRESPONDING METHOD

PRIORITY

This application claims priority of European patent application EP 19 179 849.5 filed on Jun. 13, 2019, which is incorporated by reference herewith.

FIELD OF THE INVENTION

The invention relates to a remote access and control system, especially for test and measurement setups and a corresponding remote access and control method.

BACKGROUND OF THE INVENTION

Generally, in times of an increasing globalization within the scope of measurements and the related increasing number of remote measurement sites, there is a growing need of a remote access and control system for test and measurement setups and a corresponding remote access and control method.

According to document DE 100 18 651 A1, mobile radiotelephones which are suitable for data transmission are used for remote-controlling electronic measuring devices whose functions can be regulated through a microprocessor. Said mobile radiotelephones can also be used to remote-transmit the measuring data of the measuring device. Disadvantageously, establishing and maintaining the respective remote control connection is complex and expensive, which leads to a reduced measurement efficiency.

Accordingly, there is a need to provide a remote access and control system for test and measurement setups and a corresponding remote access and control method in order to allow for performing measurements in a remote manner, thereby ensuring a high efficiency of the measurement.

SUMMARY OF THE INVENTION

According to a first aspect of the invention, a remote ACCESS and control system for test and measurement setups is provided. The remote access and control system comprises at least one virtual network, wherein the at least one virtual network is persistently defined as a set of test and measurement instruments and accompanying hardware. Advantageously, in this manner, complexity can be reduced, which leads to an increased measurement efficiency.

Further advantageously, the above-mentioned persistent definition may comprise a persistent definition to different network configurations and/or substituted measurement instruments. It is further noted that the above-mentioned accompanying hardware may comprise at least one of a computer, a virtual machine, or the combination thereof.

As a further advantage, particular users can be given access to a particular virtual network without being given access to the whole network. Furthermore, the particular users can get access to the necessary measurement instruments only.

According to a first preferred implementation form of the first aspect of the invention, the remote access and control system further comprises at least one remote system preferably comprising at least a part of the set of test and measurement instruments and accompanying hardware. Additionally, the remote access and control system is configured to grant an access level to the at least one remote system to the at least one virtual network. Advantageously, said access level can be customized if necessary, thereby increasing measurement efficiency.

In this context, customization may comprise at least one of allowing ethernet, allowing SCIPI, allowing ethernet according to the SCIPI standard, mounting a shared network drive, or any combination thereof.

According to a second preferred implementation form of the first aspect of the invention, the at least one remote system is configured to have not access to the complete respective physical network with respect to the at least one virtual network. Advantageously, for instance, measurement efficiency and security can further be increased.

According to a further preferred implementation form of the first aspect of the invention, the at least one virtual network is configured to allow at least one virtual network connection. In addition to this or as an alternative, the remote access and control system is configured to set up a connection with at least one particular measurement device of the set of test and measurement instruments and accompanying hardware in order to control the at least one particular measurement device or the respective measurement site. Advantageously, for instance, this allows application engineers to assist customers with configuring their devices.

In this context, it is noted that it might be particularly advantageous if said connection comprises or is based on a virtual instrument software architecture (VISA) connection.

According to a further preferred implementation form of the first aspect of the invention, with respect to at least one access account for at least one particular remote system originating outside an entities internal network preferably of the at least one remote system, the remote access and control system is configured to give specific access rights to at least one particular virtual network preferably of the at least one virtual network. Advantageously, for example, an application engineer may only get access sometimes.

According to a further preferred implementation form of the first aspect of the invention, the specific access rights are limited to at least one of at least one specific port, a package inspection firewall, specific data, time, or any combination thereof. Advantageously, access rights can precisely be specified, thereby increasing measurement efficiency.

In this context, it is noted that it might be particularly advantageous if the at least one specific port comprises or is a port for the hypertext transfer protocol (HTTP), preferably port 80.

According to a further preferred implementation form of the first aspect of the invention, the at least one remote system is configured to bridge over a large geographical distance. Advantageously, for instance, measurement efficiency can further be increased.

According to a further preferred implementation form of the first aspect of the invention, the at least one remote system is configured to transmit at least one test sequence to at least one particular measurement device of the set of test and measurement instruments and accompanying hardware. Advantageously, for example, the occurrence of errors can be reduced, thereby increasing measurement efficiency.

According to a further preferred implementation form of the first aspect of the invention, the remote access and control system further comprises a web-based dashboard. In this context, the web-based dashboard is configured to allow access to multiple-authenticated users. Additionally or alternatively, the web-based dashboard is configured to show at least one of the respective measurement setup preferably comprising at least a part of the set of test and measurement instruments and accompanying hardware, the corresponding measurement displays of the respective measurement setup, measurement data belonging to the respective measurement setup, or any combination thereof. Advantageously, for instance, the web-based dashboards allows for an increased measurement efficiency.

According to a further preferred implementation form of the first aspect of the invention, the remote access and control system is configured to inform at least one particular measurement device of the set of test and measurement instruments and accompanying hardware that the at least one particular measurement device is part of a respective measurement site. In addition to this or as an alternative, the remote access and control system is configured to instruct the at least one particular measurement device to give access to its measurement data. Advantageously, for example, measurement efficiency can further be increased.

According to a further preferred implementation form of the first aspect of the invention, the remote access and control system further comprises at least one remote storage. In this context, the remote access and control system is configured to update the corresponding measurement data from at least one particular measurement device of the set of test and measurement instruments and accompanying hardware to the at least one remote storage in the form of at least one remote instrument profile. Advantageously, the at least one remote storage may especially comprise or be a cloud storage.

According to a further preferred implementation form of the first aspect of the invention, the at least one remote instrument profile comprises at least one of I/Q data, at least one waveform, at least one saved setting, at least one script, at least one matlab script, at least one test script, at least one screenshot, other data, or any combination thereof. Advantageously, for instance, the measurement efficiency can further be increased.

According to a further preferred implementation form of the first aspect of the invention, in the case that at least one new measurement device is substituted for at least one particular measurement device of the set of test and measurement instruments and accompanying hardware, the remote access and control system is configured to update the at least one new measurement device with the respective remote instrument profile of the at least one particular measurement device. Advantageously, for example, measurement failures can further be reduced, which leads to an increased measurement efficiency.

According to a further preferred implementation form of the first aspect of the invention, in the case that the at least one particular measurement device is moved or acquires a different IP address, the at least one particular measurement device is configured to reach out to the corresponding measurement site on the at least one remote storage to authenticate automatically and/or to become part of the respective measurement site. Advantageously, each device in the virtual network knows it is part of that network. Further advantageously, the network definition, preferably the network definition on the at least one remote storage or the cloud, knows the identifier of each device.

According to a second aspect of the invention, a remote access and control method for test and measurement setups is provided. The remote access and control method comprises the step of employing at least one virtual network, wherein the at least one virtual network is persistently defined as a set of test and measurement instruments and accompanying hardware. Advantageously, in this manner, complexity can be reduced, which leads to an increased measurement efficiency.

Further advantageously, the above-mentioned persistent definition may comprise a persistent definition to different network configurations and/or substituted measurement instruments. It is further noted that the above-mentioned accompanying hardware may comprise at least one of a computer, a virtual machine, or the combination thereof.

As a further advantage, particular users can be given access to a particular virtual network without being given access to the whole network. Furthermore, the particular users can get access to the necessary measurement instruments only.

According to a first preferred implementation form of the second aspect, the remote access and control method further comprises the step of configuring the at least one virtual network to allow at least one virtual network connection. Advantageously, for example, also multiple connections are possible.

According to a second preferred implementation form of the second aspect, the remote access and control method further comprises the step of setting up a connection with at least one particular measurement device of the set of test and measurement instruments and accompanying hardware in order to control the at least one particular measurement device or the respective measurement site. Advantageously, for instance, this allows application engineers to assist customers with configuring their devices.

According to a further preferred implementation form of the second aspect, the remote access and control method further comprises the step of configuring at least one remote system to bridge over a large geographical distance.

Advantageously, for example, measurement efficiency can further be increased.

According to a further preferred implementation form of the second aspect, the remote access and control method further comprises the step of configuring the at least one remote system to transmit at least one test sequence to at least one particular measurement device of the set of test and measurement instruments and accompanying hardware. Advantageously, for instance, the occurrence of errors can be reduced, thereby increasing measurement efficiency.

According to a further preferred implementation form of the second aspect, the remote access and control method further comprises the step of employing a web-based dashboard, wherein the web-based dashboard is configured to allow access to multiple-authenticated users. Advantageously, for example, the web-based dashboards allows for an increased measurement efficiency.

BRIEF DESCRIPTION OF THE DRAWINGS

Exemplary embodiments of the invention are now further explained with respect to the drawings by way of example only, and not for limitation. In the drawings.

DETAILED DESCRIPTION OF PREFERRED EMBODIMENTS

Figure 1:
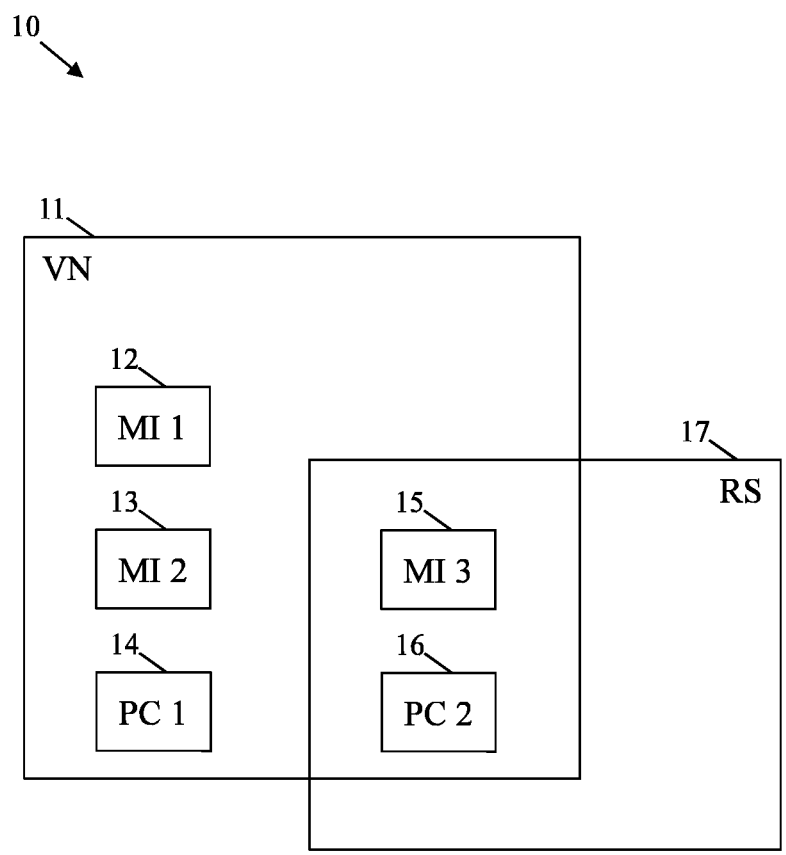
FIG. 1 shows a first embodiment of the first aspect of the invention.

With respect to FIG. 1, a block diagram of an exemplary embodiment of a remote access and control system 10 for test and measurement setups is shown.

According to FIG. 1, the remote access and control system comprises a virtual network 11, wherein the virtual network 11 is persistently defined as a set of three measurement instruments, namely a first measurement instrument 12, a second measurement instrument 13, and a third measurement instrument 15, and accompanying hardware in the form of two personal computers, namely a first personal computer 14, and second personal computer 16.

In addition to this, the remote access and control system 10 further comprises a remote system 17 comprising a part of the above-mentioned set, namely the third measurement instrument 15 and the second personal computer 16. Furthermore, the remote access and control system 10 is configured to grant an access level to the remote system 17 to the virtual network 11.

In this context, it is noted that the remote access control system 10 may especially comprise a controller being configured to grant an access level to the remote system 17 to the virtual network 11.

Moreover, the remote system 17 is configured to have not access to the complete respective physical network with respect to the virtual network 11 especially with the aid of the remote access control system 10 or the optional controller thereof. In other words, the remote access control system 10 or the optional controller thereof configures the remote system 10 to have not access to the complete respective physical network with respect to the virtual network 11.

It is further noted that the virtual network 11 is configured to allow at least one virtual network connection especially with the aid of the remote access control system 10 or the optional controller thereof. In other words, the remote access control system 10 or the optional controller thereof configures the remote system 10 to allow at least one virtual network connection.

In addition to this or as an alternative, the remote access and control system 10 is configured to set up a connection with at least one particular measurement device of the set of the three measurement instruments 12, 13, 15 and the two personal computers 14, 16 in order to control the at least one particular measurement device or the respective measurement site.

Alternatively, the optional controller of the remote access and control system 10 is configured to set up a connection with at least one particular measurement device of the set of the three measurement instruments 12, 13, 15 and the two personal computers 14, 16 in order to control the at least one particular measurement device or the respective measurement site.

It is further noted that with respect to at least one access account for at least one particular remote system originating outside an entities internal network, the remote access and control system 10 is configured to give specific access rights to at least one particular virtual network.

Alternatively, the optional controller of the remote access and control system 10 is configured to give specific access rights to at least one particular virtual network with respect to at least one access account for at least one particular remote system originating outside an entities internal network.

In this context, the specific access rights are preferably limited to at least one of at least one specific port, a package inspection firewall, specific data, time, or any combination thereof. Furthermore, the remote system 17 is configured to bridge over a large geographical distance especially with the aid of the remote access and control system 10 or the optional controller thereof. Moreover, the remote system 17 is configured to transmit at least one test sequence to at least one particular measurement device of the set of three measurement instruments 12, 13, 15 and accompanying hardware in the form of the two personal computers 14, 16.

It might be particularly advantageous if the remote access and control system 10 further comprises a web-based dashboard, wherein the web-based dashboard is configured to allow access to multiple-authenticated users especially with the aid of the remote access and control system 10 or the optional controller thereof.

Additionally or alternatively, especially with the aid of the remote access and control system 10 or the optional controller thereof, the web-based dashboard is configured to show at least one of the respective measurement setup preferably comprising at least a part of the set of the three measurement instruments 12, 13, 15 and the two personal computers 14, 16, the corresponding measurement displays of the respective measurement setup, measurement data belonging to the respective measurement setup, or any combination thereof.

It is further noted that the remote access and control system 10 or the optional controller thereof is configured to inform at least one particular measurement device of the set of the three exemplary measurement instruments 12. 13, 15 and the two exemplary personal computers 14, 16 that the at least one particular measurement device is part of a respective measurement site.

In addition to this or as an alternative, the remote access and control system 10 or the optional controller of the remote access and control system 10 is configured to instruct the at least one particular measurement device to give access to its measurement data.

It might be particularly advantageous if the remote access and control system 10 further comprises at least one remote storage, wherein the remote access and control system 10 or the optional controller thereof is configured to update the corresponding measurement data from at least one particular measurement device of the set of the exemplary three measurement instruments 12, 13, 15 and accompanying hardware in the exemplary form of the two personal computers 14, 16 to the at least one remote storage in the form of at least one remote instrument profile.

In this context, the at least one remote instrument profile comprises at least one of I/Q data, at least one waveform, at least one saved setting, at least one script, at least one matlab script, at least one test script, at least one screenshot, other data, or any combination thereof.

Moreover, in the case that at least one new measurement device is substituted for at least one particular measurement device of the set of the three measurement instruments 12, 13, 15 and the two personal computers 14, 16, the remote access and control system 10 or the optional controller thereof is configured to update the at least one new measurement device with the respective remote instrument profile of the at least one particular measurement device.

It is further noted that in the case that the at least one particular measurement device is moved or acquires a different IP (internet protocol) address, the at least one particular measurement device is configured to reach out to the corresponding measurement site on the at least one remote storage to authenticate automatically and/or to become part of the respective measurement site.

Figure 2:
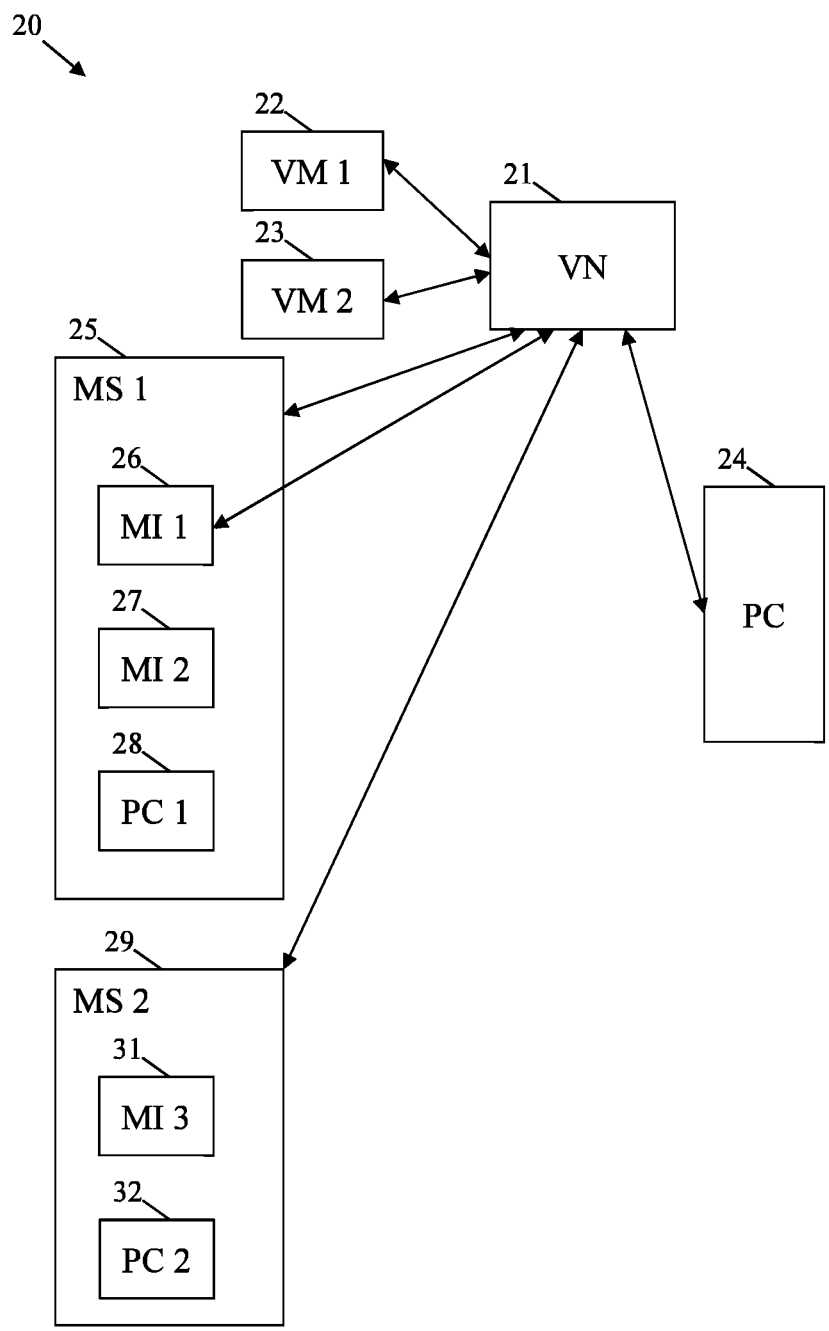
FIG. 2 shows a second embodiment of the first aspect of the invention.

Now, with respect to FIG. 2, a second embodiment 20 of the inventive remote access and control system is illustrated. The remote access and control system 20 comprises a virtual network 21, a first virtual machine 22 connected to the virtual network 21, a second virtual machine 23 connected to the virtual network 21, a personal computer 24 connected to the virtual network 21, a first measurement site 25 connected to the virtual network 21, and a second measurement site 29 connected to the virtual network 21.

As it can further be seen, the first measurement site 25 comprises a first measurement instrument 26 connected the virtual network 21, a second measurement instrument 27, and a first personal computer 28. The second measurement site 29 comprises a third measurement instrument 31 and a second personal computer 32.

Exemplarily, the virtual network 21 may comprise virtual network service, preferably a virtual network micro service, especially for handling the shown connections. Furthermore, for instance, the first virtual machine 22 may be a virtual Windows system, whereas the second virtual machine 23 may be a virtual Linux system.

As a further example, the connection from the personal computer 24 to the first measurement site 25 via the virtual network 21 may especially be based on a VISA connection.

The personal computer 24 may exemplarily allow for IECWIN, Python, Matlab, or any combination thereof.

It is additionally noted that the measurement instruments 26, 27, 31 may comprise at least one of a signal generator, a spectrum analyzer, a network analyzer, or any combination thereof.

Figure 3:
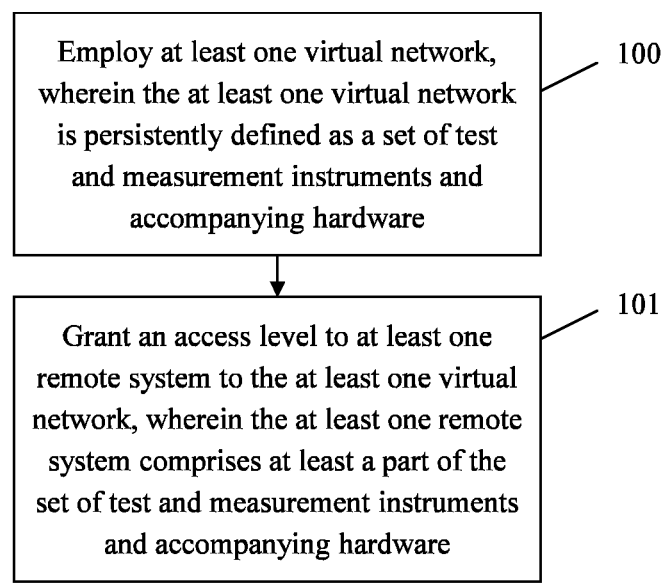
FIG. 3 shows a flow chart of an embodiment of the second aspect of the invention.

Finally, FIG. 3 shows a flow chart of an embodiment of the inventive remote access and control method for test and measurement setups. In a first step 100, at least one virtual network is employed, wherein the at least one virtual network is persistently defined as a set of test and measurement instruments and accompanying hardware. Then, in a second step 101, an access level is granted to at least one remote system to the at least one virtual network, wherein the at least one remote system comprises at least a part of the set of test and measurement instruments and accompanying hardware.

Figure 4:
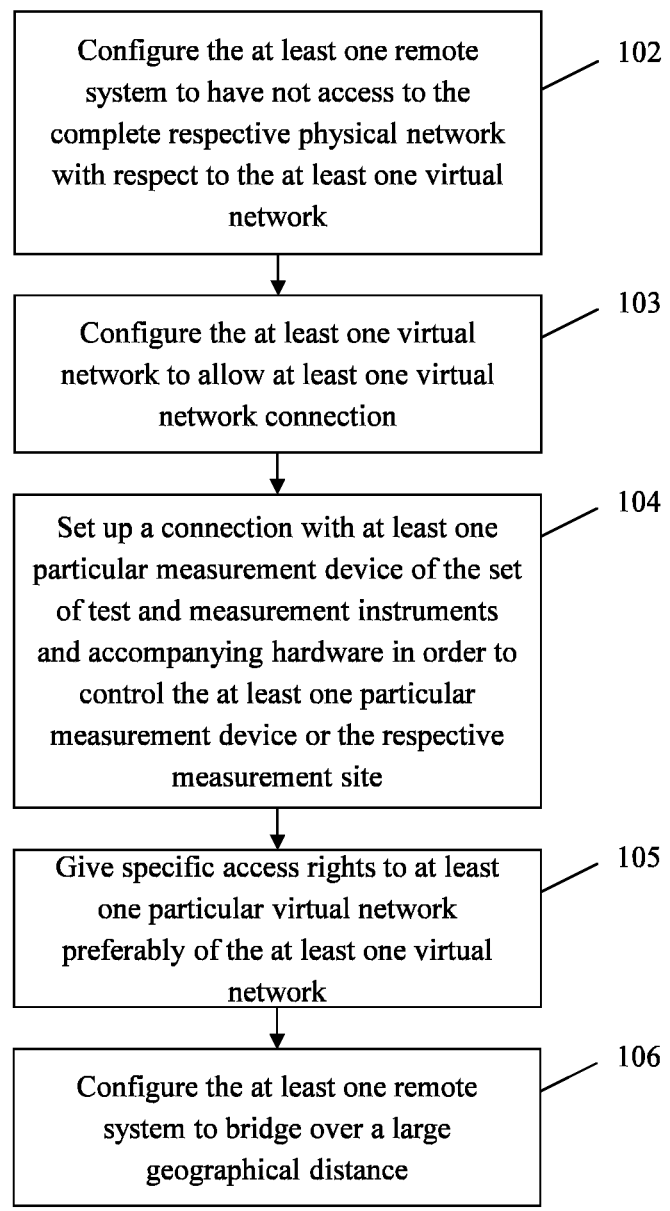
FIG. 4 shows a flow chart of a further embodiment of the second aspect of the invention.

In this context, in accordance with FIG. 4, it might be particularly advantageous if the remote access and control method may further comprise the step of configuring the at least one remote system to have not access to the complete respective physical network with respect to the at least one virtual network. Furthermore, according to step 103 of FIG. 4, the remote access and control method may advantageously comprise the step of configuring the at least one virtual network to allow at least one virtual network connection.

In addition to this or as an alternative, in accordance with step 104, the remote access and control method may comprise the step of setting up a connection with at least one particular measurement device of the set of test and measurement instruments and accompanying hardware in order to control the at least one particular measurement device or the respective measurement site.

Moreover, with respect to at least one access account for at least one particular remote system originating outside an entities internal network preferably of the at least one remote system, the remote access and control method may advantageously comprise the step of giving specific access rights to at least one particular virtual network preferably of the at least one virtual network according to step 105 of FIG. 4. In this context, it is noted that the specific access rights may be limited to at least one of at least one specific port, a package inspection firewall, specific data, time, or any combination thereof.

Figure 5:
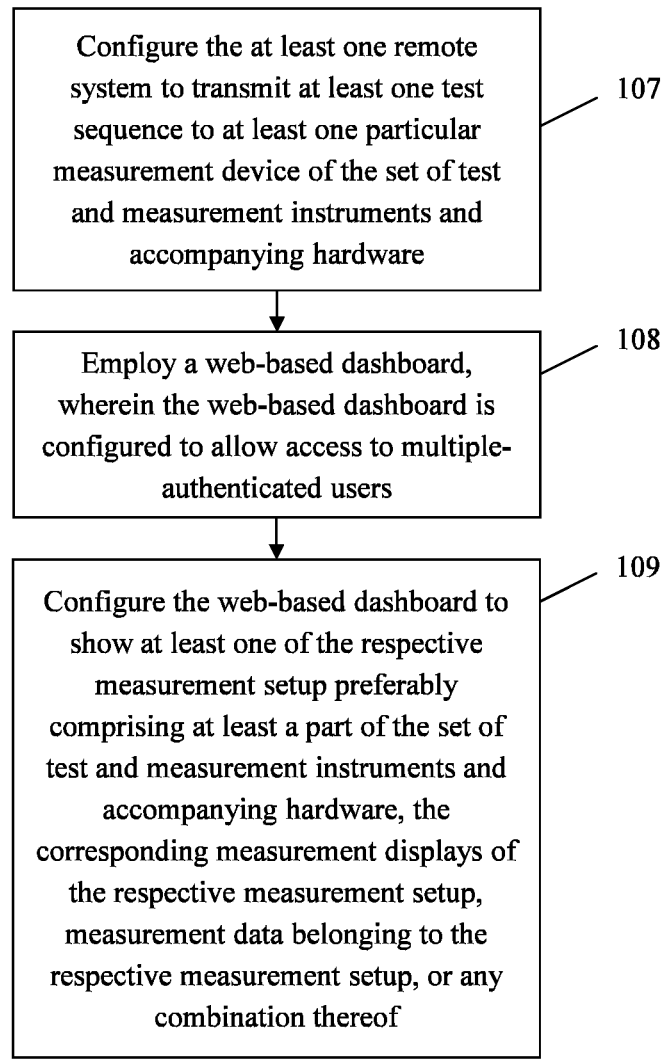
FIG. 5 shows a flow chart of a further embodiment of the second aspect of the invention.

Furthermore, also in accordance with FIG. 4, it might be particularly advantageous if the remote access and control method further comprises the step of configuring the at least one remote system to bridge over a large geographical distance. In addition to this or as an alternative, in accordance with FIG. 5, the remote access and control method may comprise the step of configuring the at least one remote system to transmit at least one test sequence to at least one particular measurement device of the set of test and measurement instruments and accompanying hardware. Moreover, according to step 108 of FIG. 5, the remote access and control method may further comprise the step of employing a web-based dashboard, wherein the web-based dashboard is configured to allow access to multiple-authenticated users.

Additionally or alternatively, in accordance with step 109, the remote access and control method may comprise the step of configuring the web-based dashboard to show at least one of the respective measurement setup preferably comprising at least a part of the set of test and measurement instruments and accompanying hardware, the corresponding measurement displays of the respective measurement setup, measurement data belonging to the respective measurement setup, or any combination thereof.

Figure 6:
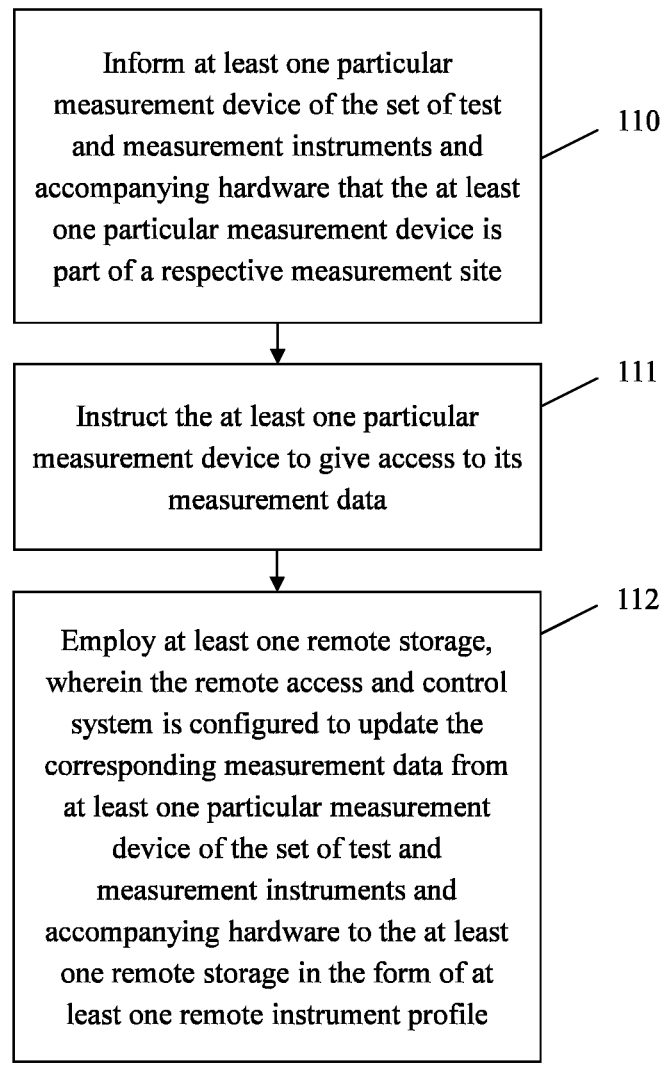
FIG. 6 shows a flow chart of a further embodiment of the second aspect of the invention.

In further addition to this or as a further alternative, in accordance with FIG. 6, the remote access and control method may comprise the step of informing at least one particular measurement device of the set of test and measurement instruments and accompanying hardware that the at least one particular measurement device is part of a respective measurement site. Further additionally or further alternatively, according to step 111 of FIG. 6, the remote access and control method may comprise the step of instructing the at least one particular measurement device to give access to its measurement data.

In accordance with step 112 of FIG. 6, it is further noted that it might be particularly advantageous if the remote access and control method further comprises the step of employing at least one remote storage, wherein the remote access and control system is configured to update the corresponding measurement data from at least one particular measurement device of the set of test and measurement instruments and accompanying hardware to the at least one remote storage in the form of at least one remote instrument profile.

In this context, the at least one remote instrument profile may advantageously comprise at least one of I/Q data, at least one waveform, at least one saved setting, at least one script, at least one matlab script, at least one test script, at least one screenshot, other data, or any combination thereof.

Figure 7:
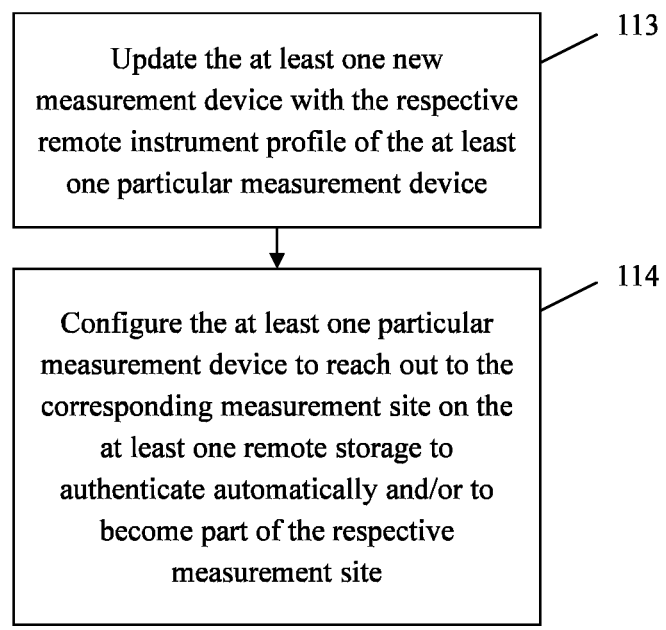
FIG. 7 shows a flow chart of a further embodiment of the second aspect of the invention.

Furthermore, in the case that at least one new measurement device is substituted for at least one particular measurement device of the set of test and measurement instruments and accompanying hardware, in accordance with step 113 of FIG. 7, the remote access and control method may comprise the step of updating the at least one new measurement device with the respective remote instrument profile of the at least one particular measurement device.

Moreover, in the case that the at least one particular measurement device is moved or acquires a different IP address, according to step 114 FIG. 7, the remote access and control method may further comprise the step of configuring the at least one particular measurement device to reach out to the corresponding measurement site on the at least one remote storage to authenticate automatically and/or to become part of the respective measurement site.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What claimed is:

1. A remote access and control system comprising:
   at least one test and measurement setup,
   the remote access and control system further comprising:
   at least one virtual network,
   wherein the at least one virtual network is persistently defined as a set of test and measurement instruments and accompanying hardware,
   wherein the remote access and control system may be restricted from accessing a complete respective physical network with respect to the at least one virtual network, and
   wherein the at least one virtual network comprises a virtual network micro service.

2. The remote access and control system according to claim 1,
   wherein the remote access and control system further comprises at least one remote system comprising at least a part of the set of test and measurement instruments and the accompanying hardware,
   wherein the remote access and control system is configured to grant an access level to the at least one remote system to the at least one virtual network.

3. The remote access and control system according to claim 2,
   wherein the remote access and control system further comprises at least one remote system, and
   wherein the at least one remote system is configured to have not access to the complete respective physical network with respect to the at least one virtual network.

4. The remote access and control system according to claim 1,
   wherein the at least one virtual network is configured to allow at least one virtual network connection, and/or
   wherein the remote access and control system is configured to set up a device connection with at least one particular measurement device of the set of test and measurement instruments and accompanying hardware in order to control the at least one particular measurement device or respective measurement site.

5. The remote access and control system according to claim 2,
   wherein with respect to at least one access account for at least one particular remote system originating outside an entities internal network of the at least one remote system, the remote access and control system is configured to give specific access rights to at least one particular virtual network of the at least one virtual network.

6. The remote access and control system according to claim 5,
   wherein the specific access rights are limited to at least one of at least one specific port, a package inspection firewall, specific data, time, or any combination thereof.

7. The remote access and control system according to claim 2,
   wherein the at least one remote system is configured to bridge over a large geographical distance.

8. The remote access and control system according to claim 2,
   wherein the at least one remote system is configured to transmit at least one test sequence to at least one particular measurement device of the set of test and measurement instruments and accompanying hardware.

9. The remote access and control system according to claim 1,
   wherein the remote access and control system further comprises a web-based dashboard,
   wherein the web-based dashboard is configured to allow access to multiple-authenticated users, and/or
   wherein the web-based dashboard is configured to show the at least one measurement setup comprising at least a part of the set of test and measurement instruments and the accompanying hardware, corresponding measurement displays of the at least one measurement setup, measurement data belonging to the at least one measurement setup, or any combination thereof.

10. The remote access and control system according to claim 1,
    wherein the remote access and control system is configured to inform at least one particular measurement device of the set of test and measurement instruments and the accompanying hardware that the at least one particular measurement device is part of a respective measurement site, and/or
    wherein the remote access and control system is configured to instruct the at least one particular measurement device to give access to a measurement data from the at least one particular measurement device.

11. The remote access and control system according to claim 1,
    wherein the remote access and control system further comprises at least one remote storage,
    wherein the remote access and control system is configured to update corresponding measurement data from at least one particular measurement device of the set of test and measurement instruments and the accompanying hardware to the at least one remote storage in a form of at least one remote instrument profile.

12. The remote access and control system according to claim 11,
    wherein the at least one remote instrument profile comprises at least one of I/Q data, at least one waveform, at least one saved setting, at least one script, at least one matlab script, at least one test script, at least one screenshot, other data, or any combination thereof.

13. The remote access and control system according to claim 1,
wherein in a case that at least one new measurement device is substituted for at least one particular measurement device of the set of test and measurement instruments and the accompanying hardware, the remote access and control system is configured to update the at least one new measurement device with a respective remote instrument profile of the at least one particular measurement device.

14. The remote access and control system according to claim 11,
wherein in a case that the at least one particular measurement device is moved or acquires a different IP address, the at least one particular measurement device is configured to reach out to a corresponding measurement site on the at least one remote storage to authenticate automatically and/or to become part of a respective measurement site.

15. A remote access and control method comprising:
at least one test and measurement setup,
the remote access and control method further comprising the steps of:
employing at least one virtual network, and not having access to a complete respective physical network with respect to the at least one virtual network,
wherein the at least one virtual network is persistently defined as a set of test and measurement instruments and accompanying hardware, and
wherein the at least one virtual network comprises a virtual network micro service.

16. The remote access and control method according to claim 15, wherein the remote access and control method further comprises the step of configuring the at least one virtual network to allow at least one virtual network connection.

17. The remote access and control method according to claim 15,
wherein the remote access and control method further comprises the step of setting up a device connection with at least one particular measurement device of the set of test and measurement instruments and the accompanying hardware in order to control the at least one particular measurement device or a respective measurement site.

18. The remote access and control method according to claim 15,
wherein the remote access and control method further comprises the step of configuring at least one remote system to bridge over a large geographical distance.

19. The remote access and control method according to claim 18,
wherein the remote access and control method further comprises the step of configuring the at least one remote system to transmit at least one test sequence to at least one particular measurement device of the set of test and measurement instruments and the accompanying hardware.

20. The remote access and control method according to claim 15,
wherein the remote access and control method further comprises the step of employing a web-based dashboard, wherein the web-based dashboard is configured to allow access to multiple-authenticated users.

* * * * *